United States Patent
Landwehr et al.

(10) Patent No.: US 7,210,073 B1
(45) Date of Patent: Apr. 24, 2007

(54) WORKFLOWS FOR PERFORMANCE MANAGEMENT METHODOLOGY

(75) Inventors: Michael Landwehr, Kirribilli (AU); Shiri Kerman-Hendel, Tel-Aviv (IL); Ofer Dascalu, Ness-Ziona (IL); Ayal Leibowitz, Modiin (IL)

(73) Assignee: Precise Software Solutions Ltd., Or-Yehuda (IL)

( * ) Notice: Subject to any disclaimer, the term of this patent is extended or adjusted under 35 U.S.C. 154(b) by 471 days.

(21) Appl. No.: 10/749,364

(22) Filed: Dec. 31, 2003

(51) Int. Cl.
*G06F 11/00* (2006.01)

(52) U.S. Cl. .................................. 714/47; 709/223
(58) Field of Classification Search ............... 714/47, 714/48, 57; 709/223, 224
See application file for complete search history.

(56) References Cited

U.S. PATENT DOCUMENTS

| | | | |
|---|---|---|---|
| 5,664,093 A | 9/1997 | Barnett et al. | |
| 6,012,152 A | 1/2000 | Douik et al. | |
| 6,249,755 B1 | 6/2001 | Yemini et al. | |
| 6,338,149 B1 | 1/2002 | Ciccone, Jr. et al. | |
| 6,473,794 B1 | 10/2002 | Guheen et al. | |
| 6,598,090 B2 | 7/2003 | Champlin | |
| 6,658,654 B1 * | 12/2003 | Berry et al. | 717/131 |
| 6,665,262 B1 | 12/2003 | Lindskog et al. | |
| 6,738,736 B1 | 5/2004 | Bond | |
| 6,738,933 B2 * | 5/2004 | Fraenkel et al. | 714/47 |
| 6,792,460 B2 * | 9/2004 | Oulu et al. | 709/224 |
| 6,856,942 B2 | 2/2005 | Garnett et al. | |
| 6,910,036 B1 * | 6/2005 | Shee | 707/5 |
| 2003/0065986 A1 * | 4/2003 | Fraenkel et al. | 714/47 |
| 2003/0110153 A1 * | 6/2003 | Shee | 707/1 |

* cited by examiner

*Primary Examiner*—Nadeem Iqbal
(74) *Attorney, Agent, or Firm*—Meyertons Hood Kivlin Kowert & Goetzel, P.C.; B. Noël Kivlin

(57) ABSTRACT

Methods and systems are provided for performance management methodology and exception report workflows in a performance management system. A performance management methodology workflow may assist a user in performing a plurality of performance management tasks in a performance management system: detecting a performance problem in a computer system, identifying a root cause of the performance problem in a particular application tier or particular system component, improving the performance of the computer system by implementing a solution to the root cause, and verifying that the solution to the root cause has improved the performance problem. An exception report workflow may include defining a plurality of exceptions for a managed computer system comprising a plurality of application tiers. One or more of the plurality of exceptions is triggered in response to collected performance metrics. An exception report which comprises performance metrics related to the one or more triggered exceptions is automatically generated.

29 Claims, 7 Drawing Sheets

| Program | Average Time | Volume | CPU | Lock Wait |
|---|---|---|---|---|
| Program 1 | ▓▓▓ | ▓▓▓ |  | /// |
| Program 2 | ■ | ▓▓▓ | ▓▓▓ | ▓▓▓ |
| Program 3 | ▓▓▓ | /// |  | /// |
| Program 4 |  | ▓▓▓ |  |  |
| Program 5 | /// | ▓▓▓ | /// |  |
| Program 6 | ▓▓▓ |  | /// | ▓▓▓ |
| Program 7 | ▓▓▓ | ■ | /// |  |
| Program 8 | ■ | /// | ■ | ▓▓▓ |

Over 30% deviation

Between 20% - 30% deviation

Between 10% - 20% deviation

No deviation or less than 10% deviation

| Program | Total Time | I/O | CPU | Locking |
|---|---|---|---|---|
| Program 1 | ■ | ■ | 10₁₂ | ■ |
| Program 2 | ■ | ■ | | 7₁ |
| Program 3 | | 6 | ■ | 4 |
| Program 4 | 4₃ | 7₁₁ | 4₃ | 9₇ |
| Program 5 | | | ■ | |
| Program 6 | | | ■ | |
| Program 7 | ■ | ■ | | ■ |
| Program 8 | 7 | 5 | 9 | 5 |
| Program 9 | 8₆ | | 5₆ | |
| Program 10 | 5₁₂ | 4₂₁ | 6₁₀ | ■ |
| Program 11 | 6 | 8 | 7 | 6 |
| Program 12 | 9₇ | | 8₅ | 10₉ |
| Program 13 | 10 | 9 | | 8 |
| Program 14 | | 10₉ | | |

 Ordered in the top-3 consumers

 Ordered in the top-6 consumers but not the top-3

 Ordered in the top-10 consumers but not the top-6

 Does not belong to top-10 consumers

N    Entity is ordered N in top-10 consumers

N    Entity is ordered N in top-10 at the baseline

_    Entity is new (does not exist in baseline)

Figure 7

WORKFLOWS FOR PERFORMANCE MANAGEMENT METHODOLOGY

BACKGROUND OF THE INVENTION

1. Field of the Invention

This invention is related to the field of application performance management and, more particularly, to workflows in performance management.

2. Description of the Related Art

In the information technology (IT) departments of modern organizations, one of the biggest challenges is meeting the increasingly demanding service levels required by users. With more and more applications directly accessible to customers via automated interfaces such as the world wide web, "normal" business hours for many enterprises are now 24 hours a day, 7 days a week. The need for continuous availability and performance of applications has created complex, tiered IT infrastructures which often include web servers, middleware, networking, database, and storage components. These components may be from different vendors and may reside on different computing platforms. A problem with any of these components can impact the performance of applications throughout the enterprise.

The performance of key applications is a function of how well the infrastructure components work in concert with each other to deliver services. With the growing complexity of heterogeneous IT environments, however, the source of performance problems is often unclear. Consequently, application performance problems can be difficult to detect and correct. Furthermore, tracking application performance manually can be an expensive and labor-intensive task. Therefore, it is usually desirable that application performance management tasks be automated.

Automated tools for application performance management may assist in providing a consistently high level of performance and availability. These automated tools may result in lower costs per transaction while maximizing and leveraging the resources that have already been spent on the application delivery infrastructure. Automated tools for application performance management may give finer control of applications to IT departments. Application performance management tools may enable IT departments to be proactive and fix application performance issues before the issues affect users. Historical performance data collected by these tools can be used for reports, trending analyses, and capacity planning. By correlating this collected information across application tiers, application performance management tools may provide actionable advice to help IT departments solve current and potential problems.

In a real-world environment, the performance of applications may be highly variable due to normal variations in resource usage over time. Furthermore, requirements such as user needs, usage patterns, customization requirements, system components, architectures, and platform environments may vary from business unit to business unit. These variations may also cause application performance to be highly variable. Tuning applications to work together efficiently and effectively in their unique environments can be crucial to reaching organizational goals and maintaining competitive advantages. Automated tools for application performance management can assist in these tuning operations.

SUMMARY OF THE INVENTION

Various embodiments of a system and method described herein may provide workflows for performance management methodologies and exception reports. A performance management methodology workflow may assist a user in performing a plurality of performance management tasks in a performance management system. The first task may comprise detecting a performance problem in a computer system, wherein the computer system comprises one or more application tiers and a plurality of system components. The second task may comprise identifying a root cause of the performance problem in a particular application tier or particular system component of the one or more application tiers and plurality of system components. The third task may comprise improving the performance of the computer system by implementing a solution to the root cause of the performance problem in the particular application tier or particular system component. The fourth task may comprise verifying that the solution to the root cause of the performance problem has improved the performance problem.

An exception report workflow in performance management may include defining a plurality of exceptions for a managed computer system, wherein the managed computer system comprises a plurality of application tiers. One or more of the plurality of exceptions may be triggered in response to performance metrics collected for the managed computer system. An exception report may be automatically generated and may comprise performance metrics related to the one or more triggered exceptions.

BRIEF DESCRIPTION OF THE DRAWINGS

FIG. 7 is an exemplary diagram of a profile heat matrix according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

A performance management system may include one or more software programs for application performance management. By continuously monitoring key components and/or applications of computer systems, the performance management system may act to detect and correct performance problems among applications and other system components in a complex computing environment. The performance management system may provide performance management in a variety of stages, such as: identification of symptoms that could indicate a performance problem, identification of sources or locations of problems, discovery of root causes of problems, recommendation of measures to address the root causes and improve performance, and verification that the measures have achieved desired goals. By defining baselines for "normal" application behavior, the performance management system may automatically detect degradation based on those established norms.

In one embodiment, the performance management system may be implemented in a variety of versions, each of which is customized for management of a particular class of target software: e.g., various products from PeopleSoft, Inc.; Oracle® database management software and related applications; web-based applications; SAPS; various products from Siebel Systems, Inc.; ClarifyCRM™; J2EE™; and other suitable targets. Furthermore, each of the versions may be implemented on one or more computing platforms (e.g., Solaris running on Sun Microsystems™ hardware, or a Microsoft Windows® OS running on Intel-based hardware). As used herein, the term "performance management system" is intended to include all of these disparate, customized software programs.

Figure 1:
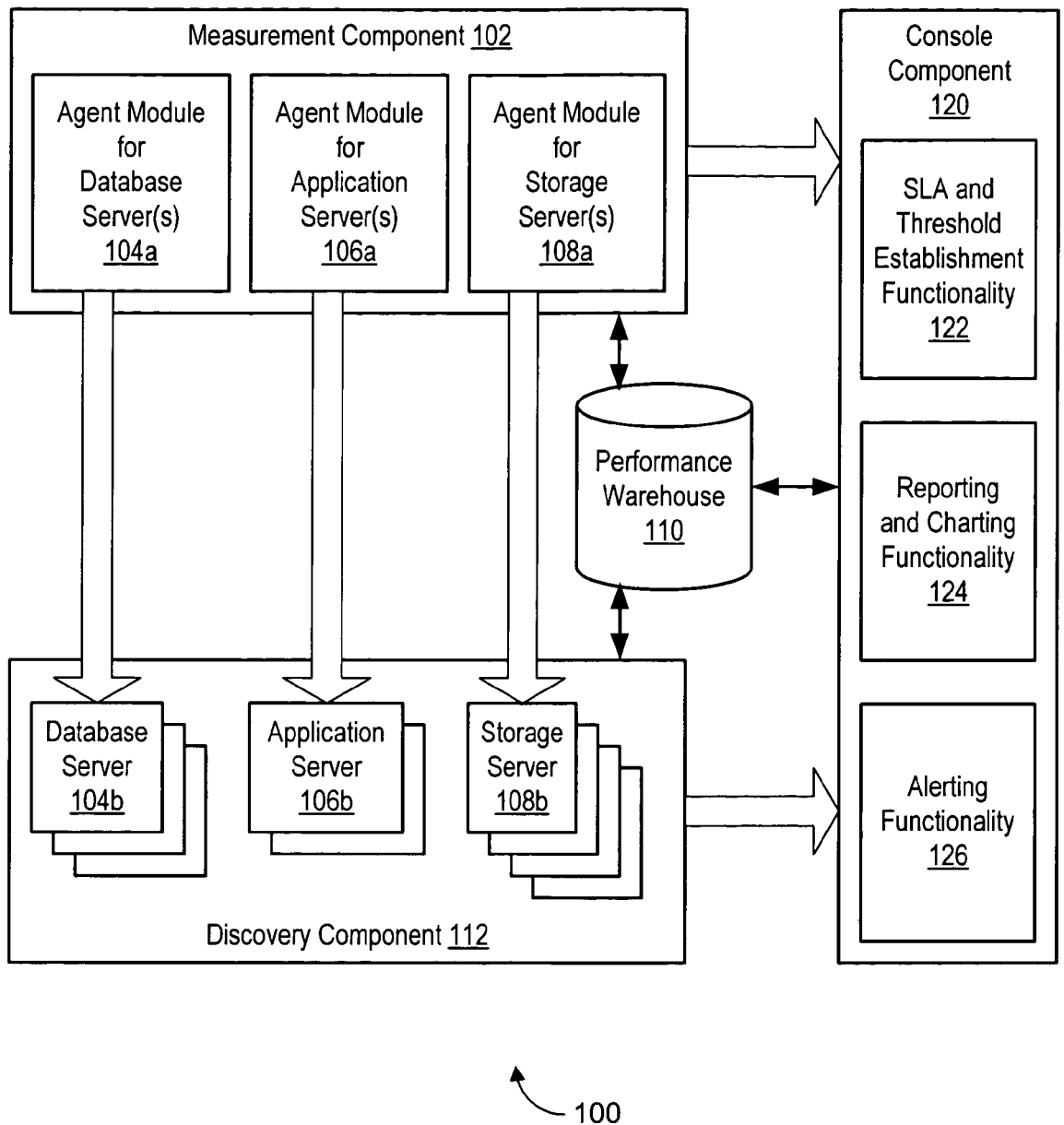
FIG. 1 illustrates an exemplary performance management system in which embodiments of a system and method for performance management may be implemented.
Figure 2:
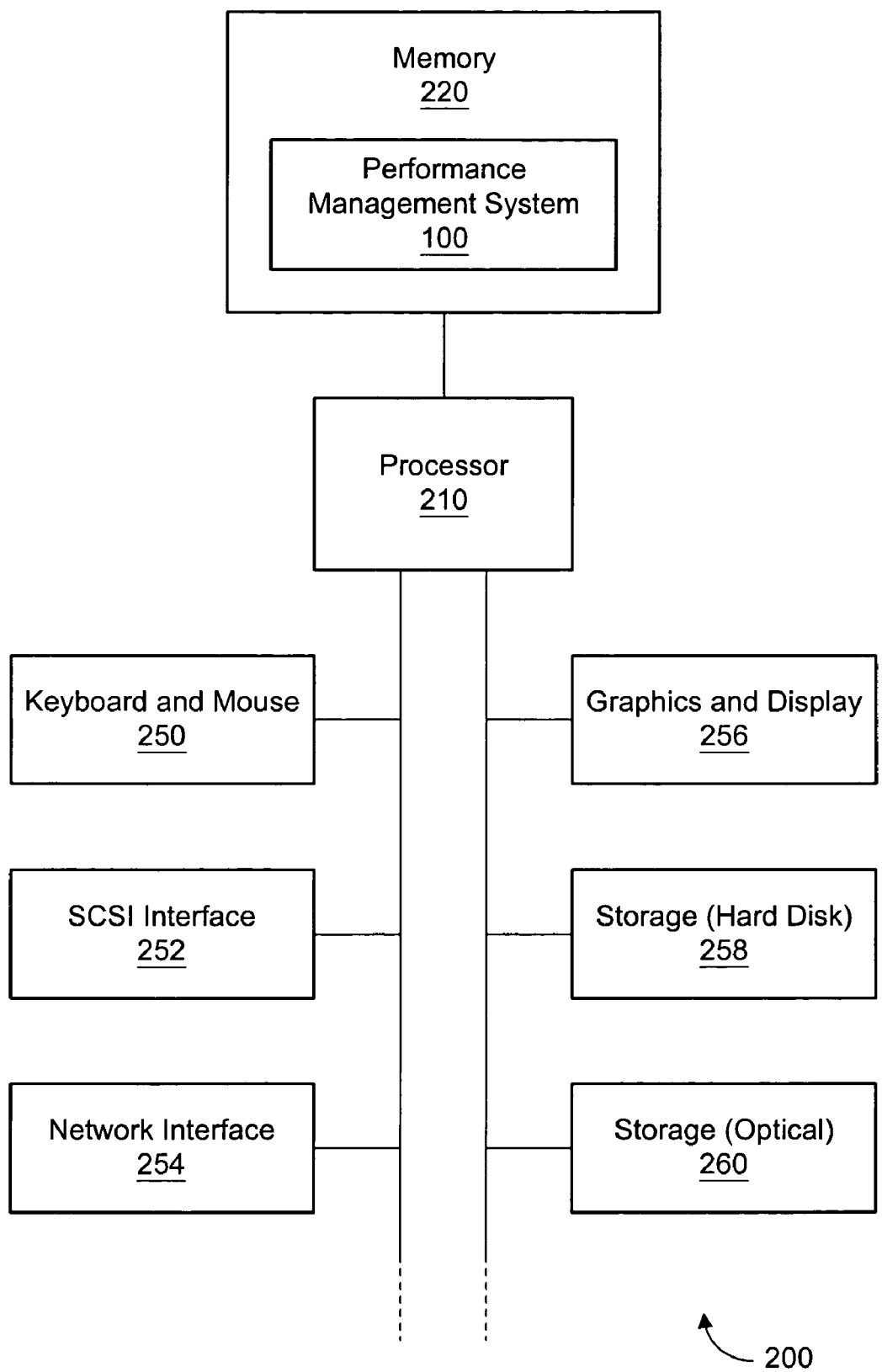
FIG. 2 illustrates components of an exemplary computer system with which embodiments of a system and method for performance management may be implemented.

FIG. 1 is an architecture diagram of a performance management system 100 in an exemplary configuration. As illustrated in FIG. 1, the performance management system 100 may include components such as a measurement component 102 (including various agent modules 104a, 106a, and 108a), a discovery component 112, a console component 120, and a performance warehouse 110. The various components of the performance management system 100 may reside on the same computer system, on different computer systems, or on an arbitrary combination of computer systems. An exemplary computer system is illustrated in FIG. 2.

In one embodiment, the measurement component 102 uses agent software to capture performance metrics on servers running target applications. The measurement component 102 may provide a "breadth-wise" view of performance across multiple technology tiers (e.g., web clients, web servers, networks, application servers, database servers, storage servers, etc.). The measurement component 102 may measure, for example, end-to-end response times from the viewpoint of a user. The measurement component 102 may measure segmented response times from tier to tier and may therefore indicate the location of performance problems in a particular tier.

In one embodiment, a "base" version of the measurement component 102 may provide monitoring of a limited set of targets (e.g., TCP/IP-based applications). The functionality of the measurement component 102 may be augmented with optional agent modules that are customized to gather and analyze data for particular targets (e.g., web clients, web servers, networks, application servers, database servers, storage servers, etc.). For purposes of illustration and example, three agent modules 104a, 106a, and 108a are shown. Other combinations of agent modules may be used in other configurations.

In one embodiment, the discovery component 112 provides identification and resolution of root causes of performance degradation. By permitting a user to "drill down" through various tiers of hardware and software (e.g., individual servers), the discovery component 112 may provide a "depth-wise" view of performance within each of the tiers that a target application crosses. The discovery component 112 may further indicate steps to be taken to fix current problems or avoid future problems.

In FIG. 1, each of the server blocks 104b, 106b, and 108b within the discovery component 112 are intended to represent installations of agent software on the respective servers. For example, the three database server blocks 104b represent three agent software modules associated with three respective database server installations. Likewise, the two application server blocks 106b represent two agent software modules associated with three respective application server installations, and the four storage server blocks 108b represent four agent software modules associated with four respective storage server installations. The combination of servers 104b, 106b, and 108b is provided for purposes of illustration and example and is not intended to be limiting.

In one embodiment, the console component 120 includes a "watchdog" layer that communicates key performance indicators, such as exceptions to service level agreements (SLAs), to appropriate users at appropriate times. The console component 120 may include functionality 122 for establishing SLAs and other thresholds. The console component 120 may include functionality 124 for reporting and charting. The console component 120 may include functionality 126 for providing alerts. Therefore, the console component 120 may function as a management console for user interaction with the measurement component 102 and discovery component 112.

In one embodiment, the performance warehouse 110 includes a repository of performance metrics which are accessible to the other components in the performance management system 100. For example, the historical data in the performance warehouse 110 may be used by the other components to provide short- and long-term analysis in varying degrees of detail.

The performance management system 100 of FIG. 1 may be executed by one or more networked computer systems. FIG. 2 is an exemplary block diagram of such a computer system 200. The computer system 200 includes a processor 210 and a memory 220 coupled together by communications bus 205. The processor 210 can be a single processor or a number of individual processors working together. The memory 220 is typically random access memory (RAM), or some other dynamic storage device, and is capable of storing instructions to be executed by the processor 210. For example, the instructions may include instructions for the performance management system 100. The memory 220 may store temporary variables or other intermediate information during the execution of instructions by the processor 210. The memory 220 may store operating system (OS) software to be executed by the processor 210.

In various configurations, the computer system 200 may include devices and components such as a keyboard & mouse 250, a SCSI interface 252, a network interface 254, a graphics & display device 256, a hard disk 258, and/or a CD-ROM 260, all of which are coupled to the processor 210 by a communications bus 207. The network interface 254 may provide a communications link to one or more other computer systems via a LAN (local area network), WAN (wide area network), internet, intranet, or other appropriate networks. It will be apparent to those having ordinary skill in the art that the computer system 200 can also include numerous elements not shown in the figure, such as additional storage devices, communications devices, input devices, and output devices, as illustrated by the ellipsis.

A workflow is a guided process which leads a user through a series of tasks. A performance management methodology workflow may assist a user of the performance management system 100 in performing various performance management tasks, from finding a performance problem to fixing the performance problem. The performance management methodology workflow may guide the user through functionality provided by different components of the performance management system 100, such as the measurement component 102, the discovery component 112, and the console component 120. Using the performance management methodology workflow, information may be exchanged automatically between different components of the performance management system 100. The performance management methodology workflow may guide the user through performance management for multiple application tiers (e.g., database servers, application servers, storage servers, web servers, middleware, etc.) and/or system components (e.g., hardware components, software components, storage subsystems, networks, etc.). A graphical user interface (GUI) comprising a plurality of screens, windows, dialog boxes, and other suitable GUI elements may be used in an implementation of the performance management methodology workflow.

Figure 3:
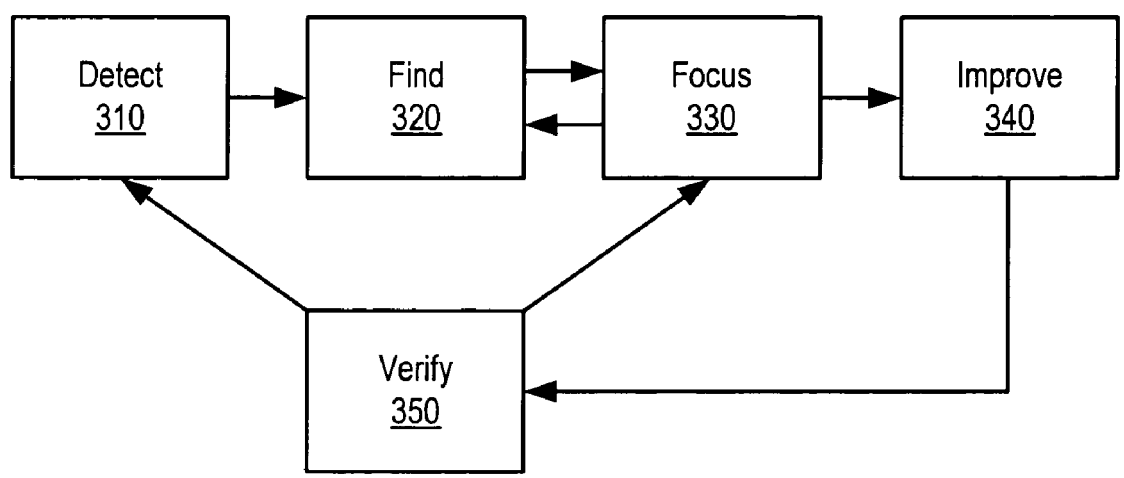
FIG. 3 illustrates high-level elements of a performance management methodology workflow in a performance management system according to one embodiment.

FIG. 3 illustrates high-level stages in a performance management methodology workflow in a performance management system according to one embodiment. In one embodiment, the performance management methodology workflow may include up to five major stages, steps, or tasks: Detect 310 (i.e., detecting performance problems using triggers), Find 320 (i.e., finding performance problems), Focus 330 (i.e., focusing on causes of performance problems), Improve 340 (i.e., improving performance), and Verify 350 (i.e., verifying the solution). Other embodiments of the performance management methodology workflow may include various subsets and combinations of the five stages as well as additional stages.

The Detect stage 310 may comprise triggers or events that initiate a performance improvement process. To trigger the process, the user typically wants an indication that performance can or should be improved, and the Detect stage 310 may effectively alert the user to such situations. After completing the Detect stage 310 of the workflow, the user may be able to determine whether there is a performance problem and a location in the system where the symptoms for the problem occur. Performance problems may include undesirable delays and slowness, undesirable usage of resources (e.g., storage), failures to meet user-specified Service Level Agreements (SLAs), and other suitable events.

In one embodiment, the triggers for the Detect stage 310 may fall into three categories: reactive, proactive, and preventive. A reactive tuning process may be triggered after a performance problem occurs. In reacting to performance problems, it is desirable to validate the existence of a real problem: because reports can be vague and subjective, the user should verify that evidence points to a genuine problem. Second, because performance reports typically relate to past performance, a user may desire enough historical information to understand the situation in which the problem occurred. The measurement component 102 and performance warehouse 110 may supply the data to carry out these reactive management tasks.

In one embodiment, the trigger for a proactive performance management activity may comprise either a performance problem identified early in its development or circumstances that indicate that a performance problem might occur. To implement the proactive component of the workflow, the user may be alerted to such situations through a mechanism that monitors a set of performance-indicating metrics. Once such a metric exceeds a predefined threshold (e.g., an SLA) or exhibits abnormal behavior, an alert may be issued (e.g., using alerting functionality 126) to attract the attention of the user to problem symptoms. Working with a proactive alerting mechanism may involve fine-tuning of thresholds, SLAs, and alerts. Although timely notification is important, an unrefined mechanism can issue false or misleading alarms, thus making the real problems hard to isolate. Setting alert thresholds correctly (e.g., using threshold establishment functionality 122) and verifying that the system is well tuned on a regular basis may therefore be critical to the effectiveness of the proactive performance management activities.

Using the reporting and charting functionality 124, the console component 120 may generate status reports for proactive problem-solving. The status reports may include "status at a glance" reports for one or more application tiers, "status drill-down" reports at varying levels of granularity, and "preliminary investigation" reports to track the history of a particular metric. The status reports may utilize performance metrics stored in the performance warehouse 110.

Preventive performance management activities may be aimed at "weeding" the system, eliminating potential risks to performance, and tuning the mechanisms for better problem handling. The trigger to preventive tuning may therefore comprise a decision on the part of a user (e.g., an IT manager) that the time has come for this sort of activity. Preventive performance management may be performed periodically and may be aimed at those parts of the system that will have the most significant impact on long-term system performance. The Detect stage 310 may comprise periodic performance reviews. Each performance review may result in a prioritized task list focusing on system components or activities that have exhibited negative performance behavior. The user may then decide on the tasks that warrant immediate action.

In one embodiment, the console component 120 may provide the functionality to support the preventive performance management activities of the workflow through automated performance reviews. The console component 120 may generate performance reviews such as top-N reports to identify major business activities and resource consumers, trend reports to establish and analyze the long-term behavior of the system, and exception reports to identify deviations from long-term system behavior. Workflows for exception reports are discussed in greater detail below.

The Find stage 320 may assist in associating the symptoms of performance problems with their sources. The Find stage 320 may provide a "black box" analysis of performance problems. A problem in one component of an application may often have its symptoms in a different component or tier, and it may become harder to trace a symptom's true cause with the increasing complexity of a system. After completing the Find stage 320, the user may be able to isolate the source for the performance problem in a particular application tier or system component. In one embodiment, the functionality of the Find stage 320 may be provided in large part by the measurement component 102.

The Find stage 320 may provide up to four different perspectives of analysis: the nominal over-time behavior of the entity, scalability and capacity analysis, baseline comparison, and service level comparison. In the process of finding the source of the performance problem, the load and performance of the system as a whole as well as each of its tiers or components may be examined. System load, usage patterns, and system response times may be examined and compared with historical baselines (stored in the performance warehouse 110) to identify deviations from normal system behavior. System load, usage patterns, and system response times may also be compared with performance goals or SLA values to identify material breaches and poor service situations.

The Find stage 320 may also include component behavior analysis to help identify how performance is affected by the individual tiers or components in the system. Component behavior analysis examines each of the tiers, as well as the relationships between them, to examine component load, activities, and service time. These values may be compared with historical baselines or SLA values. The activities in one tier may be correlated with activities in an adjacent tier to understand the relationship between them.

The Focus stage 330 may pinpoint the root cause of an identified performance problem within the problem source (e.g., an application tier or system component) identified in the Find stage 320. The Focus stage 330 may provide a "white box" analysis of performance problems. In one embodiment, the Focus stage 330 may permit the user to drill down into the tier or component causing the undesired performance symptoms to identify the reasons for its behavior. By drilling down, the user may view detailed metrics and performance information for a particular tier or component. The discovery component 112 and agent modules 104 may provide the functionality for the root cause analysis of the Focus stage 330.

If the root cause of the performance problem is not pinpointed in the Focus stage, the user may return to the Find stage 320 to identify an alternative source of the problem. In some cases, the Find stage 320 may not lead the user to the appropriate tier for performance improvements. Two typical reasons are lack of tuning fringe and usage patterns. In cases where the tuning fringe is very narrow, an investigation may lead to the conclusion that the tier under examination is well tuned or that performance levels cannot be significantly improved. Although the overall impact the tier has on service time is possibly greater than any other tier, the potential performance gains that can be achieved by further tuning are negligible, and greater improvements are more likely to be achieved by focusing on other application tiers. The second reason to look elsewhere for causes to problems arises from the usage patterns of the tier under investigation. Although the activities in the tier identified as problematic may indeed be major contributors to response time, the main reason for their impact on performance may reside in a neighboring tier. The tuning effort should be focused on the tier that uses those services rather than the one providing them. This situation is typical in multi-tier environments with extensive database operations. In such cases, the efficiency of the application tier using the database may be a more appropriate focus than the processing efficiency of the database itself.

The Improve stage 340 may provide the user with various ways to improve performance. The Improve stage 340 may identify the most suitable way to improve performance by addressing the root cause of a performance problem as determined in the Find 320 and/or Focus 330 stages. After identifying, assessing, and selecting a solution, the Improve stage 340 may assist in implementing the solution. Typical solutions may include tuning the problematic application tier or system component. Other solutions may include altering usage patterns to alleviate performance problems. The measurement component 102, discovery component 112, and console component 120 may provide the functionality for the Improve stage 340.

The Verify stage 350 may assure that the solution (e.g., selected in the Improve stage 340) has been successful. The Verify stage 350 may backtrack through previous steps, verifying at each stage (e.g., Detect 310 and Focus 330) that the solution has had the desired effect. First, the Verify stage 350 may verify that the root cause of the problem no longer exists. Second, the Verify stage 350 may then verify that the symptoms that triggered the process have also been eliminated. In one embodiment, the functionality of the Verify stage 350 may be provided by the measurement component 102, the discovery component 112, and the console component 120.

In performing the two tests of root cause resolution and problem elimination, the same components of the performance management system 100 that were used to detect, find, focus, and improve the problem may again be employed. For example, if the detection was triggered by an alert, the Verify stage 350 may verify that the alert is no longer being reported. If the process was of a preventive nature (e.g., triggered by information reported by the console component 120), updated reports should be examined to confirm that undesirable symptoms have been eliminated. And in cases where the detection was triggered by a user complaint or report, an end-user perspective provided by the measurement component 102 may be examined to verify that performance has improved.

Figure 4:
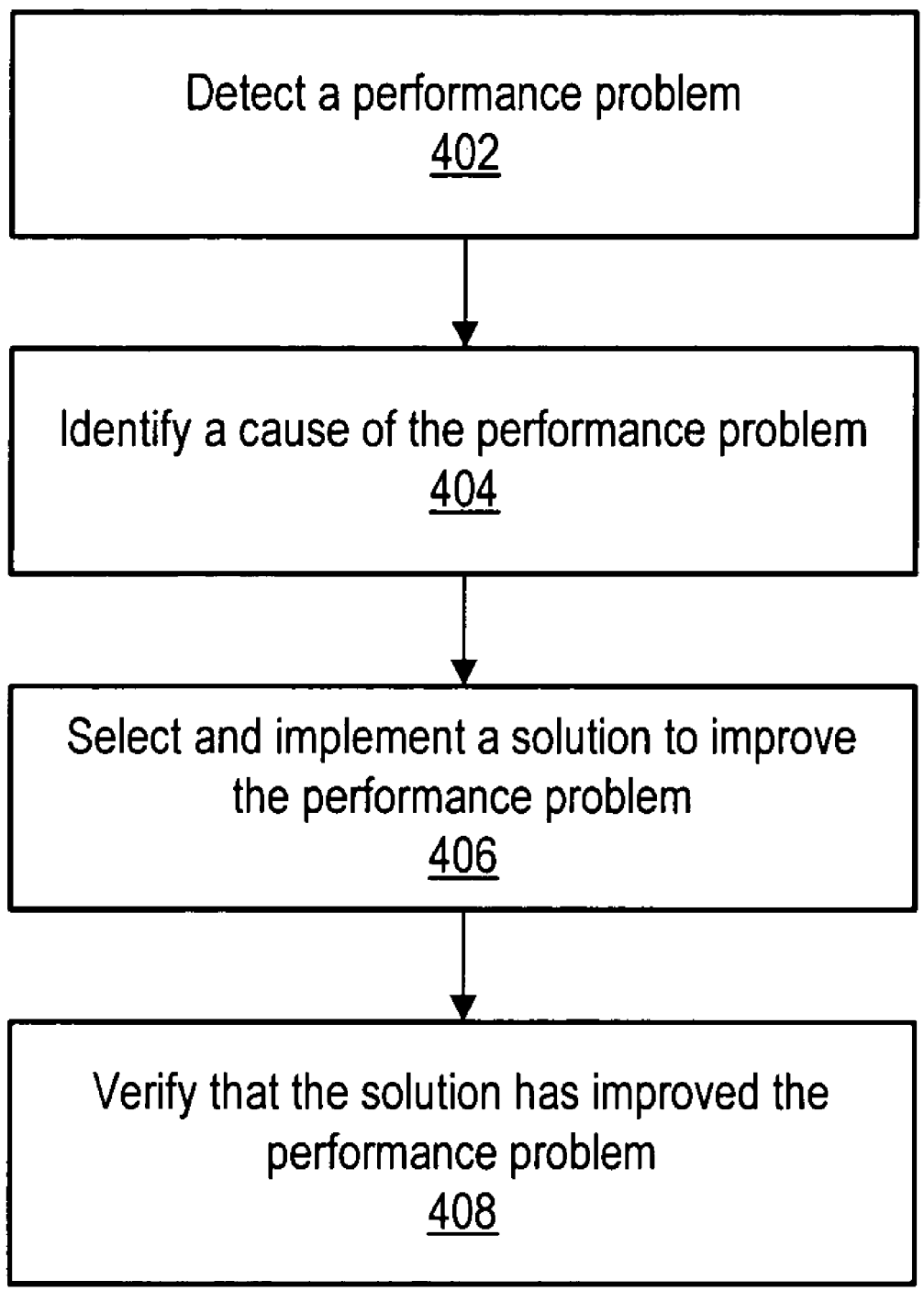
FIG. 4 is a flowchart which illustrates a performance management methodology workflow in a performance management system according to one embodiment.

FIG. 4 is a flowchart which illustrates a performance management methodology workflow in a performance management system according to one embodiment. The performance management methodology workflow may guide the user through a series of stages using a user interface such as a GUI. Performance problems may be detected using reactive, proactive, and/or preventive triggers in 402 (e.g., using the Detect stage 310). Root causes of performance problems may be identified in 404 (e.g., using the Find stage 320 and/or Focus stage 330). A solution may be selected and implemented to fix the root causes and improve performance in 406 (e.g., using the Improve stage 340). The effectiveness of the solution taken in 406 may be verified in 408 (e.g., using the Verify stage 350).

As noted above, the performance management system 100 may include workflows for exception reports and related reports. Using performance data from the performance warehouse 110, the console component 120 may generate reports according to a schedule or on demand. The reports may include performance data on multiple application tiers and system components. Reports may be viewed interactively through a GUI provided by the console component 120. Reports may also be generated for viewing outside the console component 120 (e.g., as PDF files). In one embodiment, reports may include exception reports, profile reports, capacity planning reports, load balancing reports, availability reports, and various user-defined reports. The exception reports and profile reports are discussed in greater detail below.

Figure 5:
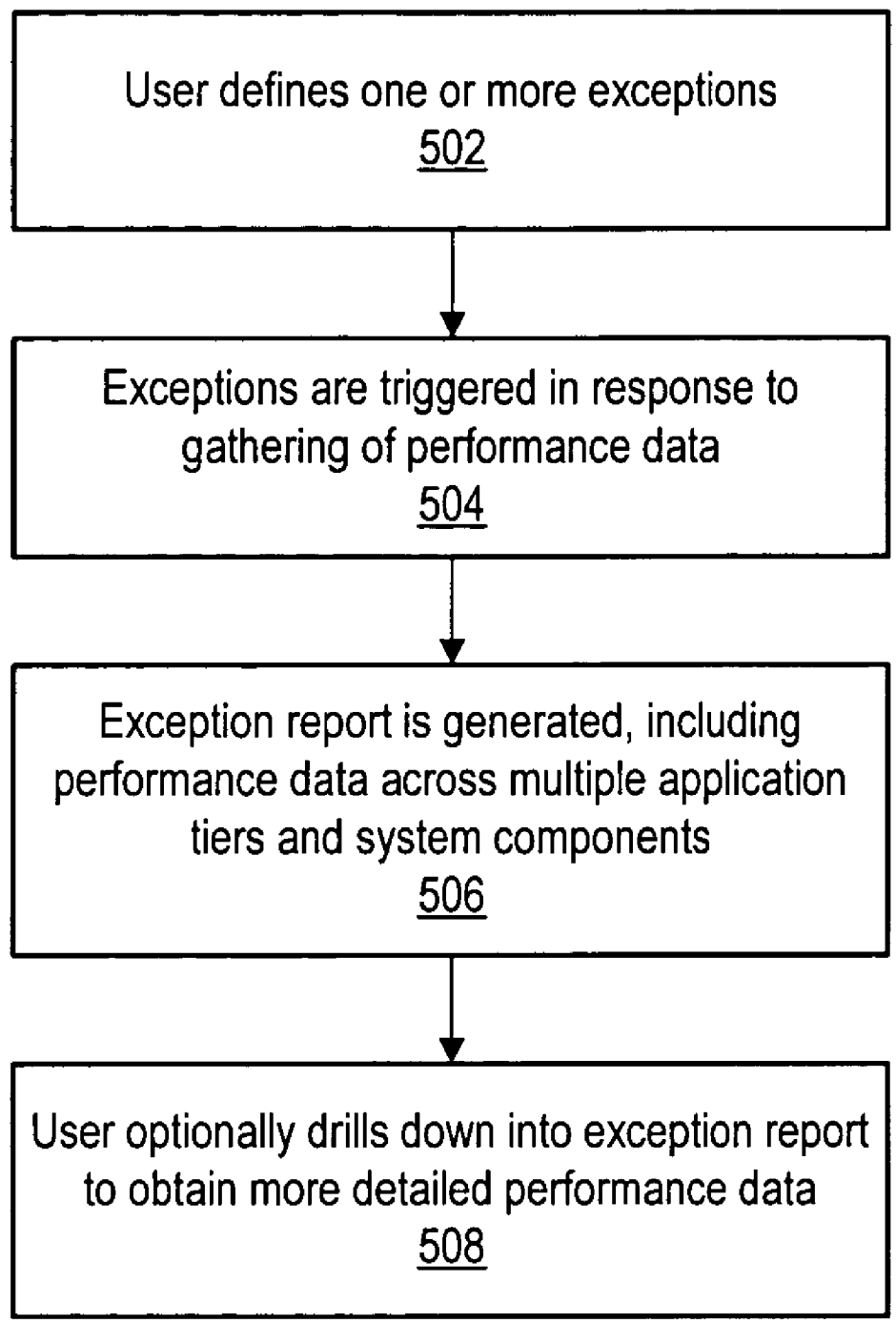
FIG. 5 is a flowchart which illustrates an exception report workflow in a performance management system according to one embodiment.

FIG. 5 is a flowchart which illustrates an exception report workflow in a performance management system according to one embodiment. In 502 the user may define one or more exceptions using the console component 120 (e.g., using the SLA and threshold establishment functionality 122). Exceptions may be defined, for example, as performance situations that exceed a user-specified threshold or historical baseline by a certain percentage. In 504 one or more exceptions are triggered based on performance data collected by the performance management system 100.

An exception report is generated by the console component 120 (e.g., using the reporting and charting functionality 124 and/or the alerting functionality 126) in 506. The exception report may be generated in response to the triggering of the exception(s), in response to a schedule (e.g., a daily report), or in response to a user request. Using performance data in the performance warehouse 110, the exception report may include data such as a summary table and detailed graphs of resource consumption over time. Exception reports are intended to help the user keep the tuned production environment in an efficient condition. They typically report on any substantial consumption which has deviated from normal behavior. The exception report may include sub-reports for performance data across multiple application tiers and system components. The user may optionally drill down into the information in the exception report in 508 to obtain more detailed performance data from the performance warehouse 110.

In one embodiment, an exception report may begin with an opening page comprising elements such as a report name, a description, a user-configurable logo, report parameters, and summary sentences. In one embodiment, the description in the exception report may be generated according to the following template, where {entity-plural-form} is the name of the entity the report is based upon in plural form (e.g. web pages, programs), {instance-plural-form} is the name of the instance-level entity of the report's application tier in plural form (e.g. instances, systems), and {minimal-deviation-percentage} is the minimal percentage an entity should deviate from its baseline in order to be considered as an exception:

"This report identifies {entity-plural-form} that are associated with significant deviations (at least {minimal-deviation-percentage}%) from their normal performance behavior, as defined by the baseline values. The report also lists "new additions"—{entity-plural-form} that have recently been active and have no matching baseline records."

"The report consists of a {if it is an entity-level report and the report is per instance then} cross-instance {end if} heat matrix, highlighting those {instance-plural-form} that are associated with the most severe exceptions. The heat matrix is followed by more detailed information for each of the {instance-plural-form} in the matrix: {if it is an entity-level report and the report is per instance then} a heat-matrix of {entity-plural-form}, highlighting those that are associated with the most severe exceptions, and {end if} overtime graphs presenting their past behavior."

In one embodiment, a first sentence of the summary may be generated according to the following template, where {entities-number} is the number of deviating entities included in the report, {entity-plural-form} is the name of the entity the report is based upon in plural form (e.g. web pages, programs), {mean-deviation} is the average deviation among all deviations included in the report, and {maximal-deviation} is the maximal deviation among all deviations included in the report:

"The report includes {entities-number} {entity-plural-form}, which met the exception criteria, with a mean deviation of {mean-deviation} % and a maximal deviation of {maximal-deviation} %."

In one embodiment, an additional sentence in the summary may be generated according to the following template, where {exceptions-number} is the number of exceptions included in the report, {counter-n-exceptions-number} is the number of exceptions from counter n, {counter-n} is the name of counter n (e.g. average time, I/O wait time), and {the-counter} is the name of the counter of which there are exceptions (in case all exceptions belong to one counter):

"{if there are exceptions from more than one counter} Among the {exceptions-number} exceptions, {if counter-1-exceptions-number is greater than zero} {counter-1-exceptions-number} {if counter-1-exceptions-number is greater than one} were {counter-1} exceptions {else} was {counter-1} exception {end-if}, {end-if}, {if counter-2-exceptions-number is greater than zero} {counter-2-exceptions-number} {if counter-2-exceptions-number is greater than one} were {counter-2} exceptions {else} was {counter-2} exception {end-if}, {end-if} . . . and {counter-n-exceptions-number} {if counter-n-exceptions-number is greater than one} were {counter-n} exceptions {else} was {counter-n} exception{end-if}. {end-if}"

In one embodiment, an additional sentence in the summary may be generated according to the following template, where {new-entities-number} is the number of new entities included in the report, {entity-single-form} is the name of the entity the report is based upon in single form (e.g. web page, program), and {entity-plural-form} is the name of the entity the report is based upon in plural form (e.g. web pages, programs):

"The report includes {new-entities-number} new {if new-entities-number is greater than one} {entity-plural-form} {else} {entity-single-form} {end-if}."

The exception report may include an instances heat matrix. For each instance, the exception report may include an entities matrix, a table for new entities, and an exceptions summary table and overtime graphs (vs. baselines) for each entity. A heat matrix goal is to summarize the exceptions information and introduce it in a colorful manner. The heat matrix emphasizes the most problematic entities or instances. An instances heat matrix may be shown at the beginning of a report, after the opening page and an entities heat matrix at the beginning of each instance. In case of reports at the entire application-tier level, the entities heat matrix may appear only once.

Figure 6:
FIG. 6 is an exemplary diagram of an exceptions heat matrix according to one embodiment.
Figure 6:
Figure 6:
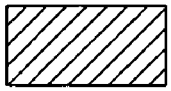
Figure 6:

FIG. 6 is an exemplary diagram of an exceptions (entities) heat matrix according to one embodiment. Each row in the instances heat matrix represents a different instance, while each row in the entities heat matrix represents a different entity (e.g., a program). Each column in both matrices represents a different counter. Each cell may be designated with a different color, pattern, or other visual cue to denote a range of deviation. The ranges of deviation and the number of ranges may be configured by the user.

In one embodiment, the ranges may be calculated automatically. The automatic calculation option may scan all the exceptions produced in the report and set the ranges by trying to distribute the exception equally, as much as possible, among the user-defined number of ranges.

In the entity-level report, each cell in the instances heat matrix may include the average counter's deviation of all the entities in the instance. In order to lead the user to the most problematic instance, each cell may also include the number of exceptions. Each cell may include a link to the overtime graphs page of the first entity in the instance.

In one embodiment, the exceptions report may include a new entities table. Each row in the table represents a new entity (e.g., a program), and each column includes a different minimum parameter (e.g., total time (hours), percentage of instance, etc.).

Parameters in the exceptions report may include general parameters, time frame parameters, and filters. General parameters may include: consider same-name entities in different instances to be: {the same entity|different entities}; report an exception when baseline is exceeded by more than n1 percents; escalate exception when baseline is exceeded by more than n2 percents; escalate exception when baseline is exceeded by more than n3 percents; and report the following exceptions: average time, executions, CPU time, I/O time, and/or lock wait. Time frame parameters may include: detect exceptions over last N days, over last N weeks, or between {first date} and {second date}; detailed overtime graphs will depict the last N days, the last N weeks, or the period between {first date} and {second date}; and analyze the following hour groups. Filters may include: analyze only the following instances; analyze only the following databases; analyze only the following entities; ignore entities with total time less than N hours; and ignore entities that consume less than N percent of their instance (or application tier).

In one embodiment, the exceptions report may include an exceptions summary table. Each row in this table includes a deviating counter (e.g., average time (sec), page views, abandons, etc.) with its latest exception details (e.g., most recently occurred, actual, baseline, deviation percentage).

In one embodiment, the exceptions report may include one or more overtime graphs (vs. baselines). One overtime graph may be displayed for each counter. Each graph may include an area for the actual consumption, a line for the baseline, and a line for the threshold, all charted over a period of time.

The console component 120 may also be configured to generate profile reports which help the user concentrate on the top consumers. Profile reports may be generated according to a schedule or on demand. Profile reports typically display information on the top-n consuming instances (in instance-level reports) and entities (in entity-level reports). In one embodiment, an profile report may begin with an opening page similar to that of the exception report.

In one embodiment, the description of the profile report may be generated according to the following template, where {top-n-value} is the number of top-n entities included in the report (i.e. the value of n), {entity-single-form} is the name of the entity the report is based upon in single form (e.g. web page, program), {entity-plural-form} is the name of the entity the report is based upon in plural form (e.g. web pages, programs), {instance-single-form} is the name of the instance-level entity of the report's application tier in single form (e.g. instance, system), {instance-plural-form} is the name of the instance-level entity of the report's application tier in plural form (e.g. instances, systems), and {counter-i} is the name of the counter i used for ordering the entities:

"This report focuses on the top-{top-n-value} {entity-plural-form} within {if it is an entity-level report and the report is per instance then} each monitored {instance-single-form} {else} the application tier {end if}. The {entity-plural-form} are ordered by the following {if number of counters is one} counter: {counter-1} {else} counters: {counter-1}, {counter-2}, . . . , {counter-n-1}, and {counter-n} {end-if}."

"The report consists of a {if it is an entity-level report and the report is per instance then} cross-instance heat matrix, ranking the {instance-plural-form} by their {entity-single-form} statistics, followed by more detailed information for each of the {instance-plural-form} in the matrix {else} heat matrix, ranking the {entity-plural-form} by the mentioned counters, followed by more detailed information for each of the {entity-plural-form} {end-if}."

In one embodiment, a first summary sentence of the profile report may be generated according to the following template, where {n} is the value of the parameter n, {entity-plural-form} is the name of the entity the report is based upon in plural form (e.g. web pages, programs), {instance-single-form} is the name of the instance-level entity of the report's application tier in single form (e.g. instance, system), {average-consumption} is the average consumption of the top-n entities divided by their total instance consumption, and {maximal-consumption} is the maximal consumption of the top-n entities divided by their total instance consumption:

"The top-{n} {entity-plural-form} consume in average {average-consumption} % of their {instance-single-form}. The maximal consumption is {maximal-consumption} %."

In one embodiment, an additional summary sentence of the profile report may be generated according to the following template, where {new-entities-number} is the number of new entities included in the top-n, {entity-single-form} is the name of the entity the report is based upon in single form (e.g. web page, program), {entity-plural-form} is the name of the entity the report is based upon in plural form (e.g. web pages, programs), and {n} is the value of the parameter n:

"The report includes {new-entities-number} new {if new-entities-number is greater than one} {entity-plural-form}, which fit into the top-{n} {entity-plural-form} {else} {entity-single-form}, which fits into the top-{n} {entity-plural-form} {end-if}."

In one embodiment, an additional summary sentence of the profile report may be generated according to the following template, where {new-in-top-n-entities-number} is the number of entities included in the top-n which are usually out of the top-n, {entity-single-form} is the name of the entity the report is based upon in single form (e.g. web page, program), {entity-plural-form} is the name of the entity the report is based upon in plural form (e.g. web pages, programs), and {n} is the value of the parameter n:

"The report includes {new-in-top-n-entities-number} {if new-in-top-n-entities-number is greater than one} {entity-plural-form}, which participate in the top-{n} {entity-plural-form}, but normally are out of the top-{n} {entity-plural-form} {else} {entity-single-form}, which participates in the top-{n} {entity-plural-form}, but normally is out of the top-{n} {entity-plural-form} {end-if}."

Parameters for the profile reports may include general parameters, time frame parameters, and filters. General parameters may include: consider same-name entities in different instances to be: {the same entity|different entities}; report top n entities; and profile entities by total time, CPU time, I/O wait, and/or lock wait. Time frame parameters may include: calculate top consumers over last N days, over last N weeks, or between {first date} and {second date}; detailed overtime graphs will depict the last N days, the last N weeks, or the period between {first date} and {second date}; and analyze the following hour groups. Filters may include: analyze only the following instances; analyze only the following databases; and analyze only the following entities.

The profile report may also include an instances heat matrix. For each instance, the profile report may include an entities heat matrix, summary charts for each counter (e.g., total time, CPU, etc.), and overtime graphs (vs. baselines) for each entity. FIG. 7 is an exemplary diagram of a profile heat matrix according to one embodiment. The goal of the profile heat matrix is to summarize the locations of the entities' counters (for entities heat matrix) or instances' counters (for instances heat matrix) in the top-n order and to compare them to their normal location (i.e., at the baseline). An instances heat matrix may be shown at the beginning of a report, and an entities heat matrix may be shown at the beginning of each instance. In case of reports at the entire application-tier level, the entities summary may appear only once. In one embodiment, each row in the instances heat matrix represents a different instance, while each row in the entities heat matrix represents a different entity. Each column in both matrices represents a different counter. Cells may include text in the form "Nn", where "N" is the current order of the entity/instance in the top-n entities/instances of the counter and "n" is the order in the baseline.

At the instance level, the profile report may include summary charts depicting bar graphs of various counters. Summary charts may include: total time vs. total time baseline, total time breakdown, volume vs. volume baseline, average time vs. average time baseline, volume vs. average time (scalability), Service Level Agreement (SLA), total CPU time vs. total CPU time baseline, average CPU time vs. average CPU time baseline, total I/O wait time vs. total I/O wait time baseline, total I/O wait time breakdown, average I/O wait time vs. average I/O wait time baseline, total lock wait time vs. total lock wait time baseline, average lock wait time vs. average lock wait time baseline, and total abandons vs. total abandons baseline.

For each entity, a list of overtime graphs (vs. baselines) may be displayed. Each overtime graph may be linked to one or more counters. The overtime graph may be omitted if the user has declined to select any counters.

In one embodiment, the profile report may take the form of a cross-application-tier report which details the performance environment across multiple application tiers. The cross-application-tier report compares the application tiers installed in the environment in terms of their total and average response times and number of executions. The cross-application-tier report may include an opening page similar to that of the exception report; summary charts including bar graphs for total time, volume, and average time; cross-application-tier overtime graphs (vs. baselines) for total time, volume, and average time; and overtime graphs (vs. baselines) for total time, volume, and average time for each application tier.

Parameters for the cross-application-tier reports may include time frame parameters and filters. Time frame parameters may include: summary charts depict the last N days, the last N weeks, or the period between {first date} and {second date}; detailed overtime graphs will depict the last N days, the last N weeks, or the period between {first date} and {second date}; and analyze the following hour groups. Filters may include: analyze only the following application tiers.

It is further noted that any of the embodiments described above may further include receiving, sending or storing instructions and/or data that implement the operations described above in conjunction with FIGS. 1–7 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing a plurality of performance management tasks in a performance management system, the method comprising:
   detecting a performance problem in a computer system, wherein the computer system comprises one or more application tiers and a plurality of system components;
   identifying a root cause of the performance problem in a particular application tier or particular system component of the one or more application tiers and plurality of system components;
   improving the performance of the computer system by implementing a solution to the root cause of the performance problem in the particular application tier or particular system component; and
   verifying that the solution to the root cause of the performance problem has improved the performance problem.

2. The method of claim 1,
   wherein detecting the performance problem comprises collecting performance metrics for the one or more application tiers and plurality of system components.

3. The method of claim 1,
   wherein identifying the root cause of the performance problem comprises drilling down into performance metrics collected for the one or more application tiers and plurality of system components.

4. The method of claim 1,
   wherein the performance management system is configured to prompt the user to perform the steps of detecting the performance problem, identifying the root cause of the performance problem, improving the performance of the computer system, and verifying that the solution has improved the performance problem.

5. A computer-readable storage medium comprising program instructions for performing a plurality of performance management tasks in a performance management system, wherein the program instructions are computer-executable to implement:
   detecting a performance problem in a computer system, wherein the computer system comprises one or more application tiers and a plurality of system components;
   identifying a root cause of the performance problem in a particular application tier or particular system component of the one or more application tiers and plurality of system components;
   improving the performance of the computer system by implementing a solution to the root cause of the performance problem in the particular application tier or particular system component; and verifying that the solution to the root cause of the performance problem has improved the performance problem.

6. The computer-readable storage medium of claim 5, wherein detecting the performance problem comprises collecting performance metrics for the one or more application tiers and plurality of system components.

7. The computer-readable storage medium of claim 5, wherein identifying the root cause of the performance problem comprises drilling down into performance metrics collected for the one or more application tiers and plurality of system components.

8. The computer-readable storage medium of claim 5, wherein the performance management system is configured to prompt the user to perform the steps of detecting the performance problem, identifying the root cause of the performance problem, improving the performance of the computer system, and verifying that the solution has improved the performance problem.

9. A system for managing performance of a managed computer system, the system comprising:
   a performance management system which is configured to collect performance metrics for the managed computer system, wherein the managed computer system comprises one or more application tiers and a plurality of system components; and
   a performance warehouse which is coupled to the performance management system and which is configured to store the performance metrics;
   wherein the performance management system is configurable to:
      detect a performance problem in the managed computer system;
      identify a root cause of the performance problem in a particular application tier or particular system component of the one or more application tiers and plurality of system components;
      improve the performance of the computer system by implementing a solution to the root cause of the performance problem in the particular application tier or particular system component; and
      verify that the solution to the root cause of the performance problem has improved the performance problem.

10. The system of claim 9, wherein in detecting the performance problem, the performance management system is configurable to detect a performance problem in the performance metrics collected for the managed computer system and stored in the performance warehouse.

11. The system of claim 9, wherein in identifying the root cause of the performance problem, the performance management system is configurable to drill down into the performance metrics collected for the one or more application tiers and plurality of system components and stored in the performance warehouse.

12. The system of claim 9, wherein the performance management system is operable to prompt the user to perform the steps of detecting the performance problem, identifying the root cause of the performance problem, improving the performance of the computer system, and verifying that the solution has improved the performance problem.

13. A system for performing a plurality of performance management tasks, the system comprising:
   means for detecting a performance problem in a computer system, wherein the computer system comprises one or more application tiers and a plurality of system components;
   means for identifying a root cause of the performance problem in a particular application tier or particular system component of the one or more application tiers and plurality of system components;
   means for improving the performance of the computer system by implementing a solution to the root cause of the performance problem in the particular application tier or particular system component; and
   means for verifying that the solution to the root cause of the performance problem has improved the performance problem.

14. A method for managing performance of a managed computer system, the method comprising:
   defining a plurality of exceptions for the managed computer system, wherein the managed computer system comprises a plurality of application tiers;
   triggering one or more of the plurality of exceptions in response to performance metrics for the managed computer system, wherein the performance metrics are collected by a performance management system and stored in a performance warehouse; and
   automatically generating an exception report comprising performance metrics related to the one or more triggered exceptions.

15. The method of claim 14, wherein the performance metrics in the exception report comprise performance metrics for at least two of the plurality of application tiers.

16. The method of claim 14, wherein the automatically generating the exception report comprises automatically generating the exception report in response to a schedule.

17. The method of claim 14, wherein the exception report comprises a heat matrix.

18. The method of claim 14, further comprising:
   drilling down into the exception report to obtain more detailed performance metrics from the performance warehouse.

19. A computer-readable storage medium comprising program instructions for managing performance of a managed computer system, wherein the program instructions are computer-executable to implement:
   defining a plurality of exceptions for the managed computer system, wherein the managed computer system comprises a plurality of application tiers;
   triggering one or more of the plurality of exceptions in response to performance metrics for the managed computer system, wherein the performance metrics are collected by a performance management system and stored in a performance warehouse; and
   automatically generating an exception report comprising performance metrics related to the one or more triggered exceptions.

20. The computer-readable storage medium of claim 19, wherein the performance metrics in the exception report comprise performance metrics for at least two of the plurality of application tiers.

21. The computer-readable storage medium of claim 19, wherein the automatically generating the exception report comprises automatically generating the exception report in response to a schedule.

22. The computer-readable storage medium of claim 19, wherein the exception report comprises a heat matrix.

23. The computer-readable storage medium of claim 19, wherein the program instructions are further computer-executable to implement:

drilling down into the exception report to obtain more detailed performance metrics from the performance warehouse.

24. A system for managing performance of a managed computer system, the system comprising:

a performance management system which is configured to collect performance metrics for the managed computer system, wherein the managed computer system comprises one or more application tiers; and a performance warehouse which is coupled to the performance management system and which is configured to store the performance metrics;

wherein the performance management system is configurable to:

define a plurality of exceptions for the managed computer system;

trigger one or more of the plurality of exceptions in response to the performance metrics for the managed computer system; and automatically generate an exception report comprising performance metrics related to the one or more triggered exceptions.

25. The system of claim 24, wherein the performance metrics in the exception report comprise performance metrics for at least two of the plurality of application tiers.

26. The system of claim 24, wherein the automatically generating the exception report comprises automatically generating the exception report in response to a schedule.

27. The system of claim 24, wherein the exception report comprises a heat matrix.

28. The system of claim 24, wherein the performance management system is configurable to:

drill down into the exception report to obtain more detailed performance metrics from the performance warehouse.

29. A system for managing performance of a managed computer system, the system comprising:

means for defining a plurality of exceptions for the managed computer system, wherein the managed computer system comprises a plurality of application tiers;

means for triggering one or more of the plurality of exceptions in response to performance metrics for the managed computer system, wherein the performance metrics are collected by a performance management system and stored in a performance warehouse; and means for automatically generating an exception report comprising performance metrics related to the one or more triggered exceptions.

* * * * *